A. WESTGARD.
SAW TOOTH.
APPLICATION FILED MAR. 15, 1919.
1,340,128.
Patented May 11, 1920.
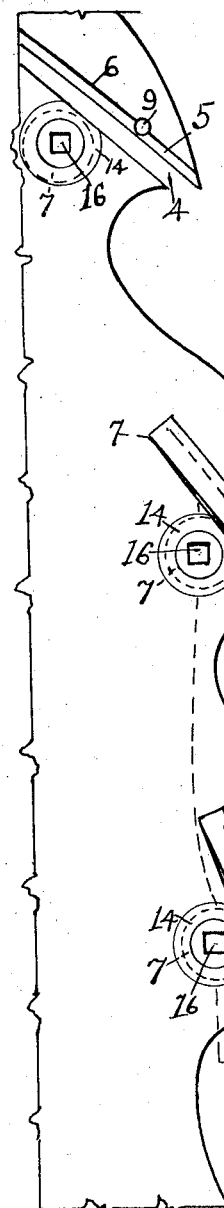
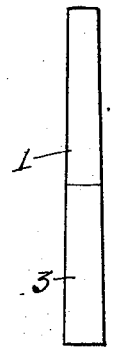
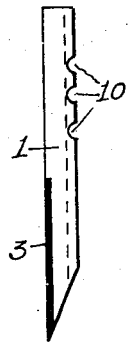
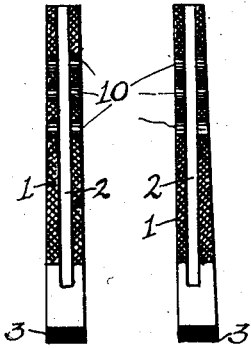
Fig. 1.  Fig. 2.  Fig. 3.  Fig. 4.
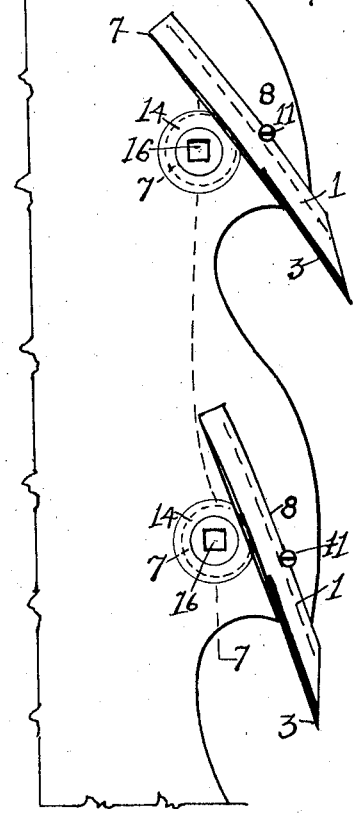
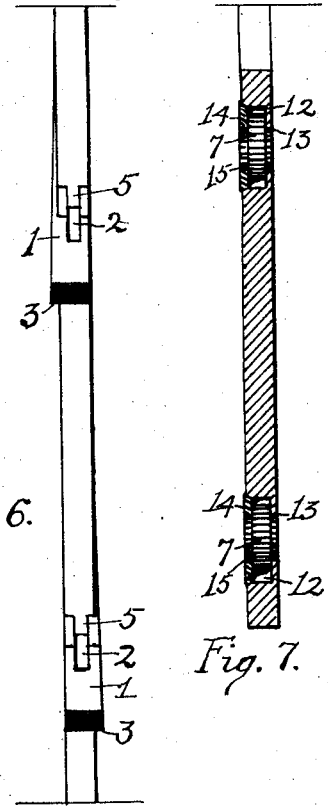
Fig. 5.  Fig. 6.  Fig. 7.
Anton Westgard, Inventor
By Mason Frank Lawrence
Attorney

UNITED STATES PATENT OFFICE.

ANTON WESTGARD, OF TACOMA, WASHINGTON.

SAW-TOOTH.

1,340,128. Specification of Letters Patent. Patented May 11, 1920.

Application filed March 15, 1919. Serial No. 282,801.

*To all whom it may concern:*

Be it known that I, ANTON WESTGARD, a citizen of the United States, residing at the city of Tacoma and county of Pierce and State of Washington, have invented new and useful Improvements in Saw-Teeth, of which the following is a specification.

My invention relates to insertible saw teeth commonly used in circular saws for cutting lumber and other wood products. The objects of my invention are, first, to provide a saw tooth having its cutting edge of high speed steel; second, to provide an insertible saw tooth that is durable; third, to provide an insertible saw tooth that will require sharpening less frequently than saw teeth now used; fourth, to provide a saw tooth that can be more simply inserted and fixed in place.

I attain these objects by means of the device illustrated in the accompanying drawings, in which Figure 1 is a view of the inside face of my improved saw tooth; Fig. 2 is a side view of the same; Figs. 3 and 4 are views of the outside face of my improved tooth, showing the right and left forms respectively; Fig. 5 is a partial side view of the edge of a circular saw, illustrating the method of inserting and fixing my improved teeth into the cutting edge of the saw; Fig. 6 is an edge view of Fig. 5; Fig. 7 is a section through Fig. 5 on line 7—7.

Similar numerals refer to similar parts in the several views.

My invention comprises a straight steel bar 1 of the tooth form shown in the several figures of the drawing. The tooth is grooved on the outer face as shown at 2 and has its cutting inner side faced with high speed steel as shown at 3. The extended cutting end is ground to a sharp edge as shown in the several views. Slots 4 are cut in the edge of the saw with a tongue 5 on the outer side of each, said tongue being designed to fit the groove 2 of the outer side of the tooth 1. The outer side 6 of the slot 4 is made slightly concave so that the tooth will be sprung to fit into the same by the cam 7 which is designed to turn against the same and lock the tooth tightly within the slot 4. It will be observed that the outer face of the tooth is roughly serrated as shown in Figs. 3 and 4 in order to secure a friction against the outer face 6 of the slot 4 so that when the cam 7 is turned against the tooth, the same is securely locked within the slot 4 as shown at 8—8 in Fig. 5. To give additional security of the tooth within the slot, a round threaded key way 9 is turned into the saw blade to fit corresponding semicircular key ways 10 in the outer face of the tooth 1. The tooth is set for the desired key way to fit the round key way 9. A threaded screw key 11 is then turned into the key way 9, thus absolutely preventing the tooth from flying out. The cam 7 is of the usual form of ordinary cams and is embedded within the saw blade as shown in Fig. 7. A receptacle 12 with a stem hole 13 is drilled into the body of the saw at the proper place and after the cam is inserted, the receptacle is closed with an annular plate 14 brazed in the open side of the receptacle, it having a corresponding hole 15 for a short stem on its side of the saw, thus giving support to the cam on both sides. A square hole 16 in the center of the cam is designed for a key to be inserted for setting the cam firmly against the tooth 1.

It will be observed that the teeth 1 are widened toward the point alternately on the right and left sides as shown in Figs. 3, 4 and 6. This causes the teeth to cut the necessary width for the saw to run freely.

My improved saw tooth, made and inserted as described, can be used in any size or form of a circular saw for cutting lumber and all kinds of wood finishing material. It is especially valuable for slotting, grooving, and mortising finishing stock. The cutting edge of the teeth being of high speed steel will run continuously for several days after sharpening, often a week in ordinary pine and fir lumber, whereas in common forms of saw teeth, sharpening is required after a few hours' use. By this means a great deal of time is saved by having to sharpen the teeth less frequently. It will be observed that high speed steel can not be sharpened with a file, but has to be sharpened with a grind stone or an emery wheel.

It will be observed that as the teeth are worn short they may be set out from the first to the second and third key ways 10 and then removed when worn too short for further use. I have found by having the high speed steel facing on the cutting side, one set of teeth may be used continuously for a year or more before wearing out. The edges stay sharp much longer and cut cleaner and more easily thus making a great saving of power.

Having thus described my invention, I claim:

1. In a wood saw, in combination with a saw body having a slot extending inward from its periphery, the rear edge of the slot being curved concavely in the plane of the saw body, an elastic tooth having opposed straight edges seated in said slot, and a device movable so as to spring said straight edged tooth into firm engagement with the curved edge of the slot and into conformity therewith.

2. In a wood saw, in combination with a saw body, said body having a tooth-seating slot extending inward from its periphery, the rear edge of the slot being curved concavely in the plane of the saw body, an elastic tooth having opposed straight edges adapted to be seated in said slot and a device movable to spring said tooth into firm engagement with the curved edge of the slot and into conformity therewith, and an interlocking means co-acting with the rear edge of the tooth and the curved edge of the slot for preventing movement of the tooth longitudinally of itself.

3. In a wood saw, in combination with a saw body having a tooth seating slot extending inward from its periphery, the rear edge of the slot being curved concavely in the plane of the saw body, an elastic tooth having opposed straight edges seated in said slot, corresponding notches being formed transversely in the curved edge of the slot, and rear edge of the tooth, a pin adapted to be seated in said notches, and a device movable to spring said straight tooth into firm engagement with the rear edge of the slot and into conformity therewith.

4. In a wood saw, a saw body with insertible teeth seated in the periphery thereof, said teeth being wider at their points than at their bases, and alternate sides of alternate teeth being flush with the corresponding sides of the body.

ANTON WESTGARD.